(12) United States Patent
Youn (10) Patent No.: US 7,564,356 B1
(45) Date of Patent: Jul. 21, 2009

(54) INTERDIGIT AC COUPLING FOR RFID TAGS

(75) Inventor: Tai Won Youn, Albuquerque, NM (US)

(73) Assignee: TC License, Ltd., Hummelstown, PA (US)

( * ) Notice: Subject to any disclaimer, the term of this patent is extended or adjusted under 35 U.S.C. 154(b) by 544 days.

(21) Appl. No.: 11/543,866

(22) Filed: Oct. 6, 2006

(51) Int. Cl.
G08B 13/14 (2006.01)
(52) U.S. Cl. .............. 340/572.1; 340/572.7; 340/572.8; 340/928; 340/825.69; 340/825.72; 340/10.1; 340/10.3
(58) Field of Classification Search .............. 340/572.7, 340/572.1, 572.8, 928, 10.1, 10.3, 825.69, 340/825.72; 343/700, 711, 789, 880; 235/492; 705/13
See application file for complete search history.

(56) References Cited

U.S. PATENT DOCUMENTS

| | | | |
|---|---|---|---|
| 4,075,632 A | 2/1978 | Baldwin |
| 4,739,328 A | 4/1988 | Koelle |
| 4,782,345 A | 11/1988 | Landt |
| 4,786,907 A | 11/1988 | Koelle |
| 4,816,839 A | 3/1989 | Landt |
| 4,853,705 A | 8/1989 | Landt |
| 5,432,518 A | 7/1995 | van Erven |
| 5,528,222 A | 6/1996 | Moskowitz |
| 5,606,323 A | 2/1997 | Heinrich |
| 5,682,143 A | 10/1997 | Brady |
| 5,786,626 A | 7/1998 | Brady |
| 5,826,328 A | 10/1998 | Brady |
| 5,847,682 A | 12/1998 | Ke |
| 5,914,692 A | 6/1999 | Bowers |
| 5,972,156 A | 10/1999 | Brady |
| 5,995,006 A | 11/1999 | Walsh |
| 6,028,564 A | 2/2000 | Duan |
| 6,078,259 A | 6/2000 | Brady |
| 6,097,347 A | 8/2000 | Duan |
| 6,118,379 A | 9/2000 | Kodukula |
| 6,121,880 A | 9/2000 | Scott |
| 6,140,146 A | 10/2000 | Brady |
| 6,147,606 A | 11/2000 | Duan |
| 6,147,655 A | 11/2000 | Roesner |

(Continued)

OTHER PUBLICATIONS

Harry Stockman, "Communication by Means of Reflected Power," Proceedings of the I.R.E., Oct. 1948, pp. 1196-1204.

(Continued)

*Primary Examiner*—Hung T. Nguyen
(74) *Attorney, Agent, or Firm*—Caesar, Rivise, Bernstein, Cohen & Pokotilow, Ltd.

(57) ABSTRACT

A radio frequency identification (RFID) tag to be attached to an object to identify the object or a characteristic or feature thereof from data stored in the tag accessible by an RFID reader includes an application-specific integrated circuit (ASIC), configured to process signals from the RFID reader and return signals related to the stored data, an interdigit AC coupling circuit, in communication with the ASIC, a matching circuit, in communication with the interdigit AC coupling circuit and an antenna, in communication with the matching circuit, configured to receive signals from the RFID reader and transmit the signals related to the stored data. The interdigit AC coupling circuit and the matching circuit provide an AC coupling and a matching impedance between the ASIC and the antenna respectively.

31 Claims, 4 Drawing Sheets

U.S. PATENT DOCUMENTS

| | | |
|---|---|---|
| 6,215,402 B1 | 4/2001 | Kodukula |
| 6,259,408 B1 | 7/2001 | Brady |
| 6,275,157 B1 | 8/2001 | Mays |
| 6,278,413 B1 | 8/2001 | Hugh |
| 6,329,915 B1 | 12/2001 | Brady |
| 6,366,260 B1 | 4/2002 | Carrender |
| 6,535,175 B2 | 3/2003 | Brady |
| 6,608,551 B1 | 8/2003 | Anderson |
| 6,617,962 B1 | 9/2003 | Horowitz |
| 6,646,328 B2 | 11/2003 | Tsai |
| 6,662,430 B2 | 12/2003 | Brady |
| 6,677,917 B2 | 1/2004 | Van Heerden |
| 6,686,830 B1 | 2/2004 | Schirtzer |
| 6,696,954 B2 | 2/2004 | Chung |
| 6,700,491 B2 | 3/2004 | Shafer |
| 6,701,605 B2 | 3/2004 | Huffer |
| 6,703,935 B1 | 3/2004 | Chung |
| 6,708,881 B2 | 3/2004 | Hartmann |
| 6,720,930 B2 | 4/2004 | Johnson |
| 6,726,099 B2 | 4/2004 | Becker |
| 6,738,025 B2 | 5/2004 | Carrender |
| 6,814,284 B2 | 11/2004 | Ehlers |
| 6,816,075 B2 | 11/2004 | Grunes |
| 6,819,244 B2 | 11/2004 | Dukler |
| 6,832,251 B1 | 12/2004 | Gelvin |
| 6,834,251 B1 | 12/2004 | Fletcher |
| 6,835,866 B1 | 12/2004 | Mangelsdorf |
| 6,835,900 B2 | 12/2004 | Jones |
| 6,836,215 B1 | 12/2004 | Laurash |
| 6,836,468 B1 | 12/2004 | O'Toole |
| 6,836,472 B2 | 12/2004 | O'Toole |
| 6,837,427 B2 | 1/2005 | Overhultz |
| 6,837,435 B2 | 1/2005 | Kehoe |
| 6,837,436 B2 | 1/2005 | Swartz |
| 6,837,438 B1 | 1/2005 | Takasugi |
| 7,055,754 B2 | 6/2006 | Forster |
| 7,102,522 B2 * | 9/2006 | Kuhns ............... 340/572.7 |
| 7,501,947 B2 * | 3/2009 | Youn ............... 340/572.1 |
| 2003/0006901 A1 | 1/2003 | Kim |
| 2003/0058180 A1 | 3/2003 | Forster |
| 2004/0036657 A1 | 2/2004 | Forster |
| 2004/0041739 A1 | 3/2004 | Forster |
| 2004/0169604 A1 | 9/2004 | Lee |
| 2004/0201522 A1 | 10/2004 | Forster |

OTHER PUBLICATIONS

Alfred R. Koelle et al., "Short-Range Radio-Telemetry for Electronic Identification, Using Modulated RF Backscatter," Proceedings of the Institute of Electrical and Electronics Engineers, pp. 1260-1261, Aug. 1975.

R.E. Bobbett et al., "Description of Model 73 Telemetry System for Reporting Temperature and Identification," LA-6410-MS Informal Report, Los Alamos Scientific Laboratory of the University of California, Los Alamos, New Mexico, pp. 1-9, Jul. 1976.

Hewlett-Packard Co., "Designing the Virtual Battery," Application Note 1088, Nov. 1997, pp. 1-8, USA.

Edward C. Jordan et al., "Electromagnetic Waves and Radiating Systems," Second Edition, Prentice-Hall Electrical Engineering Series, pp. 496-519, Prentice-Hall, Inc., Englewood Cliffs, New Jersey, 1968.

Simon Ramo et al., "Fields and Waves in Communication Electronics," pp. 668-671, John Wiley & Sons, Inc., 1967.

Roger F. Harrington, "Time-Harmonic Electromagnetic Fields," McGraw-Hill Book Company, pp. 428-431, 1961.

\* cited by examiner

Interdigit AC Coupling
410
110  Antenna

Matching Circuit

INTERDIGIT AC COUPLING FOR RFID TAGS

FIELD OF THE INVENTION

The present invention relates generally to radio frequency identification (RFID) systems and methods of operation, and, more particularly, to antenna designs for enhancing the performance of RFID tags. The present invention may also be used to improve performance of other radio systems with non-conventional and highly reactive loads where cost and size limitations are important.

BACKGROUND OF THE INVENTION

In general, RFID systems consist of a tag or multiplicity of tags implemented to provide information such as identity, features, or characteristics of an object to which the tag is affixed, and to transmit that information via an RF signal to an RFID reader in response to an RF interrogation signal received by the tag from the reader. In most instances of supply chain tagging applications, the tag is placed on a container (e.g., a carton, a case or a pallet) for a multiplicity of the same items, in contrast to item-level RFID tagging, in which each individual item is given its own RFID tag.

The identity of perhaps other information relating to the tagged article is stored in a memory device of its tag, and is transmitted by the RFID tag to a remote interrogator, or reader, in response to a scan (or query, command or interrogation—these terms, for present purposes, meaning the same thing) from the reader when the reader is within the response range of the tag, i.e., a range suitable for RF communication between reader and tag. These operating frequencies can include frequency ranges of 902 MHz to 928 MHz for the U.S., 950 MHz to 956 MHz for Europe and 865 MHz to 868 MHz for Japan.

Thus, although the term RFID has a connotation of one-way transfer of identification information from an object (the tag) to another location, RFID systems often involve two-way communication. In its most basic form, the conventional RFID tag consists of a transponder and an antenna. Often, the RFID tag itself is referred to as a transponder. These tags are in use in a variety of applications beyond supply-chain tagging, such as tracking movable assets (e.g., as diverse as rail cars and locomotives to cattle and other animals), non-stop highway toll collection, control of access to everything from secure areas of a facility to entertainment events, vehicle registration, mobile electronic payment of services, and a host of other applications where moderate communication distances and moderate data transfer are required, notwithstanding potentially difficult environments and the high speed of tagged objects. As such, RFID tags have been developed for diverse markets including retail, homeland security, health care/pharmacy, chemical, manufacturing, transport/logistics, defense/aerospace, packaging/labeling and automotive. A majority of those applications require that the RFID tag be small in size.

RFID tags may be either passive or active. A passive RFID tag lacks an internal self-sufficient power supply, e.g., a battery, and relies instead on the incoming RF query by the reader to produce sufficient power in the tag's internal circuitry to enable the tag to transmit a response. In essence, the query induces a small electrical current in the tag's antenna circuitry, which serves as the power source that enables tag operation. A passive tag may have range and function more limited than an active tag. But the absence of a battery leads to certain advantages, primarily that a passive tag can have virtually unlimited life and be fabricated at much less cost and in considerably smaller size than an active tag, thus serving an important need to improve the efficiency and accuracy of tracking systems for commerce, security and defense. The principles of the present invention are applicable to both passive and active RFID tags, but have relatively greater impact for passive tags.

Passive RFID tags usually incorporate very simple antenna structures, principally dipoles, loops or patches, in linear or circular polarized designs, with impedance matching elements. Typically, the antenna is embedded in or attached to the structure of the tag, and the antenna port has moderate impedance typically on the order of 20 to 300 ohms. In contrast, the impedance of the tag electronics is capacitive, with a typical impedance of 5-j 350 ohms.

Over the past several years, semiconductor technology has progressed to the point at which microwave Schottky diodes can, by use of CMOS (complementary metal oxide silicon) process technology, be integrated into the IC chip along with the other component circuitry of the tag's electronics. Thus, an RFID tag operating at UHF frequencies can be constructed as a single IC chip (i.e., as a radio frequency IC, or RFIC, or application-specific IC, or ASIC) together with an antenna on the same substrate. Such tags have been previously available for operation at low RF frequencies, typically at or below 13.56 MHz.

More recently, other options have been made possible for tag antennas through advances in process technology that have produced further reduction in chip size including the size of RFICs and ASICs. But antennas and impedance matching techniques heretofore proposed for passive RFID tags remain burdened by limitations on size, efficiency, cost, bandwidth, and sensitivity to nearby objects such as the surface on which the tag is mounted.

In the specific case of an RFID system consisting of a reader (interrogator) and a tag (transponder) used to complete transactions in high speed applications such as toll collection transactions by identification of authorized vehicles passing the reader in designated lane(s) at highway speed, the system configuration poses serious engineering challenges. The RFID tag should be thin, small, of straightforward design and therefore relatively easy to manufacture, of low cost, and high performance, capable of use in potentially hostile (or at least unfriendly) operating environments where the tag may be subject to extremes of vibration, chemicals, dust, temperature and humidity and other atmospheric or ambient conditions. While the utility and use of the present invention is explained in terms of an electronic toll collection, the present invention is also of great use in all other applications of RFID as well as use in systems containing fixed and handheld readers.

The design of RFID tags requires matching the antenna impedance and load impedance, usually by a matching circuit, for maximizing the RF power from the reader's interrogation or command signal received at the tag antenna to be delivered to the RFIC with minimum loss, and thereby achieve optimum tag sensitivity. The custom integrated circuit of which the RFIC is comprised may include the voltage-doubler, analog and digital circuitry of the transponder, and memory capacity to store the software programming and data to be transmitted to the reader in response to a command, as well as other electronics as may be necessary for a particular RFID design.

A significant problem encountered in seeking to use prior art RFID tags in high speed applications, such as highway on-the-fly (vehicle non-stop) toll collection systems, is the degree of difficulty encountered to design an antenna and impedance matching circuit of reasonably practical size, in order to optimize the RF communications performance of the tag.

A resonant antenna, such as the dipole antenna that has been the antenna of choice for RFID tags, has an optimum size at about a half-wavelength of the designated RF frequency for communications between RFID reader and tag. For example, if the designated RF frequency is 915 MHz, which is typical for RFID communications, one-half wavelength is about 164 mm (millimeters). The impedance matching circuit of a dipole antenna, as well as other antenna designs used in RFID tags of previous design, has a relatively small shunt inductive impedance and large series inductive impedance. Those attributes create a prodigious, virtually impossible task to design an impedance matching circuit of practical size and high energy efficiency for a dipole antenna or other antenna design heretofore proposed for use in an RFID tag.

Generally for antenna designs, the series-matching component may be easy to implement, while the shunt matching component is very difficult to implement because the circuit ground required for the shunt component is normally not well defined and not readily available without degrading antenna performance or necessitating an impractical antenna design.

SUMMARY OF THE INVENTION

It is a principal object of the present invention to provide improvements in the design of antenna and impedance matching circuitry for an RFID tag.

Another principal aim of the invention is to provide an RFID tag antenna with impedance matching circuitry of substantially smaller overall physical dimensions than have heretofore been attainable.

Accordingly, it is still another principal object of the invention to provide an improved combination of antenna with matching elements for optimizing power delivery in applications where a highly reactive load is present.

A related, more specific object of the invention is to provide an RFID tag of extremely compact size and thinness, in the form of a sticker to be adhesively applied to an object whose identity, features, characteristics, authorized use or other aspects are discernible from data stored in tag memory accessible by an RFID reader, and which is adapted to communicate with the reader through a tag antenna of small aperture design, such as a slot antenna, and of polygonal shape with central aperture.

A preferred embodiment of the present invention is described herein in the form of a thin sticker tag for electronic toll collection applications. The invention may also be used for other applications and using other construction techniques. The tag may be constructed on a conventional printed circuit board, fabricated on paper or cardboard, mounted inside a case, encapsulated in plastic, bonded by adhesive application on the inner surface of a windshield glass, and using other methods.

According to a preferred embodiment of the invention, a radio frequency identification (RFID) tag is disclosed to be attached to an object to identify the object or a characteristic or feature thereof from data stored in the tag accessible by an RFID reader. The RFID tag includes an application-specific integrated circuit (ASIC), configured to process signals from the RFID reader and return signals related to the stored data and an interdigit AC (alternating current) coupling circuit, in communication with the ASIC. The RFID tag also includes a matching circuit; in communication with the interdigit AC coupling circuit and an antenna, in communication with the matching circuit, and configured to receive signals from the RFID reader and transmit the signals related to the stored data. The interdigit AC coupling circuit and the matching circuit provide a matching impedance to an impedance of the antenna.

The interdigit AC coupling circuit, the matching circuit and the antenna may be fabricated from a single layer, where that single layer may be formed on the substrate layer. The substrate layer may be a sticker for self-adhesion to the object and the substrate layer may be a rigid layer. The interdigit AC coupling circuit, the matching circuit and the antenna may be formed from copper or from conductive ink.

The interdigit AC coupling may include a number of pairs of interdigit fingers with a coupling gap between the pairs of interdigit fingers and in which the number of pairs of interdigit fingers and the coupling gap are selected so that the interdigit AC coupling circuit and the matching circuit provide an AC coupling and a matching impedance between the ASIC and the antenna respectively. The ASIC, the interdigit AC coupling circuit, the matching circuit and the antenna may be encompassed within a coating for protection against damage from the ambient environment. Additionally, the object may be a vehicle and the surface may be the windshield of the vehicle, for RF communication of the tag with an RFID reader in the vicinity of the vehicle.

Another aspect of the invention resides in a method of enabling a vehicle to be detected automatically as being authorized for passage through a restricted lane equipped with an RFID reader. The method includes making available to the vehicle an RFID tag in the form of a planar compact sticker that incorporates a storage medium programmed with authorization data that identifies the vehicle as being permitted to pass through the lane without stopping, the sticker further including an application-specific integrated circuit (ASIC), configured to process signals from the RFID reader and return signals related to the stored data, an interdigit AC coupling circuit, in communication with the ASIC, a matching circuit in communication with the interdigit AC coupling circuit and an antenna, in communication with the matching circuit, configured to receive signals from the RFID reader and transmit the signals related to the stored data, and wherein the interdigit AC coupling circuit and the matching circuit provide a matching impedance to an impedance of the antenna.

The method may also include the step of affixing the sticker to the windshield of the vehicle. The storage medium may be programmed with authorization data that uniquely identifies the vehicle as being permitted to pass through the lane. The restricted lane may be for vehicle passage to or from a parking facility or a payment collection lane for automatic debiting of payment due with each passage of the vehicle therethrough. The restricted lane may also be a toll collection lane for automatic on-the-fly roadway toll collection with each passage of the vehicle therethrough.

Another aspect of the invention resides in a method of making a radio frequency identification (RFID) tag to be attached to an object to identify the object or a characteristic or feature thereof from data stored in the tag accessible by an RFID reader. The method includes the steps of providing a substrate layer, forming an interdigit AC coupling circuit, a matching circuit and an antenna from a single layer on the substrate layer and mounting an application-specific integrated circuit (ASIC), configured to process signals from the RFID reader and return signals related to the stored data. The interdigit AC coupling circuit is in communication with the ASIC, the matching circuit is in communication with the interdigit AC coupling circuit and the antenna is in communication with the matching circuit, where the antenna is configured to receive signals from the RFID reader and transmit the signals related to the stored data and wherein the interdigit AC coupling circuit and the matching circuit provide an AC coupling and a matching impedance between the ASIC and the antenna respectively.

BRIEF DESCRIPTION OF THE DRAWINGS

The above and other aims, objectives, aspects, features and advantages of the invention will be better understood from a consideration of the following detailed description of the best mode contemplated for practicing the invention, taken with reference to certain preferred embodiments and methods, and the accompanying drawings in which.

DETAILED DESCRIPTION OF THE INVENTION

In describing a preferred embodiment of the invention illustrated in the drawings, certain specific terminology will be used for the sake of clarity. However, the invention is not intended to be limited to that specific terminology, and it is to be understood that the terminology includes all technical equivalents that operate in a similar manner to accomplish the same or similar result.

Figure 1:
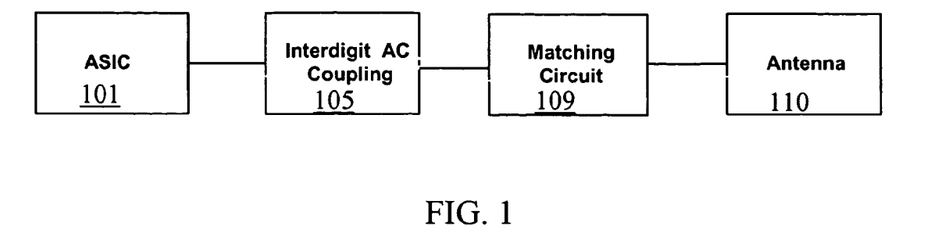
FIG. 1 is a block diagram for an RFID tag, according to at least one embodiment of the present invention.

A general description of an RFID tag according to at least one embodiment of the present invention is provided in FIG. 1. Therein, an ASIC 101, controlling the interaction of the tag with an interrogator, is connected to an interdigit AC coupling 105, which is in connection with a matching circuit 109 and, in turn, in connection with an antenna 110. The interdigit AC coupling and the matching circuit are connected between the antenna feed and the RFIC (Radio Frequency Integrated Circuit), to provide matching of the impedance from the antenna and the input impedance of the RFIC in the RFID tag. The complex impedance provided by the coupling and the circuit is readily determined by computer or microwave simulation before the tag is fabricated. Hence, nothing prevents forming the overall impedance matching at virtually any stage of the manufacturing process for RFID tag. It should be noted that no separate feedline is required to the antenna as is the case with previous designs, because the impedance matching elements are directly connected (or, in part, capacitively coupled) to the antenna and the RFIC.

Figure 2:
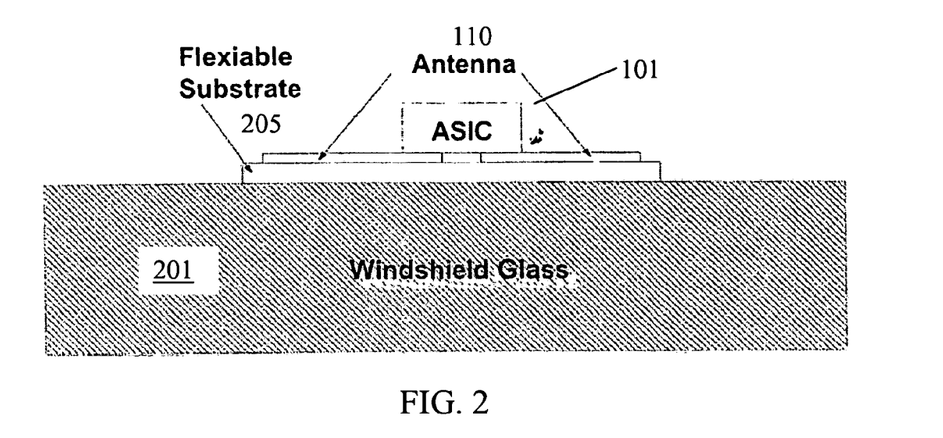
FIG. 2 is a cut-section view of an RFID tag installed on the windshield of a vehicle, according to one embodiment of the present invention.

For purposes of clarity in describing a preferred embodiment, it will be useful to refer from time to time to the sticker tag mounted (or to be mounted) on the windshield of a vehicle (again, preferably on its inside surface), as being viewed from the "windshield side," for a person standing outside the vehicle looking through the windshield at the tag; and as being viewed from the "driver side," for a person sitting inside the vehicle behind the steering wheel looking toward the windshield. FIG. 2 shows a conceptual diagram for the RFID tags of the present invention with respect to highway toll collection applications. FIG. 2 is not drawn to scale, where the windshield glass 201, may be much wider than the width of the RFID tag. The tag includes a flexible substrate 205, an antenna 110 and an ASIC 101, where it may be affixed to the windshield. The interdigit AC coupling and the matching circuit are physically combined with the antenna, which is described below.

Preferably, the antenna element 110 is printed on one side (the windshield side) of a 0.005-inch thick polyester sheet, which acts as the flexible substrate 205, where the sheet 205 is electrically insulative and a dielectric. Element 110 is a metallization layer, such as an electrically conductive plane, a thin copper sheet, plated copper, or other thin film of electrically conductive material such as a silver paste applied to the surface of the sheet 205 with a silk screen process, or conductive ink applied to that surface. More broadly, the antenna may be of any shape suitable for application as an RFID tag. The sheet 205 with the various elements of the tag thereon may be laminated with a thin film to provide a complete packaged RFID tag, as well as to provide a protective shield against environmental or ambient contaminating substances. Either or both sides of the lamination may contain printed information, logos, or other data.

A thin, passive RFID tag may be applied adhesively to the windshield of a vehicle such as an automobile for use in a highway toll collection scheme. The dimensions of the tag are suitable for this application as a windshield-mounted RFID tag for RF communication with a reader mounted at a vehicle passage lane to exact and record a toll against the identified vehicle as it passes by. For purposes of adhesion to the vehicle windshield, the surface of one side of the sheet 205 is provided with an adhesive coating or film that may be covered with a thin, peel-off, non-sticky, cover sheet (a release liner) to be removed before applying the tag to the windshield, preferably at the interior (driver side) of the vehicle about 1 inch below the windshield mounting of the rear-view mirror (i.e., antenna side of the tag against the glass). The sticker is indicative that the vehicle has been registered (authorized, and the sticker typically issued) by a government or other entity for vehicular licensing and registration purposes and/or for participation in the high speed toll collection program (e.g. by an authorization number or code stored in read-only memory of the tag that uniquely identifies the vehicle on which the sticker is mounted), often for all toll roads in the state or region encompassed by that entity. It is immaterial whether the sticker is an indicia of prepayment for a specified number of passes by the vehicle, or of a debit-type system for which toll collection is billed periodically to the vehicle owner.

In this particular example of a preferred embodiment, the RFID tag is preferably passive and its memory preferably contains a read-only section, with the vehicle's registration/authorization number or code stored therein. Then, whenever this vehicle is driven through an appropriately marked toll collection on-the-fly restricted or unrestricted lane of a toll roadway in the region where the authorization is applicable, a communication session between an RFID reader positioned in or for that lane and the passive RFID tag on the vehicle passing through results in the vehicle's authorization number being recorded for the toll collection process.

With the tag/antenna of the invention, the moderate distance between reader and tag (within the specified response range of the tag), the high sensitivity and efficiency of the tag's antenna, and the power developed in the tag from the reader's RF signal, combine to provide a highly accurate and reliable capture of the vehicle's identity despite the high speed nature of the transaction and the exposure of the tag sticker to potentially adverse environmental conditions from the standpoint of visually obscuring the tag's elements.

The present invention focuses on the use of the interdigit AC coupling for a low cost RFID design. Prior art RFID tags have been built using dipole-like antennas. The capacitance of a dipole-like antenna serves as the input capacitance required for the ASIC. The ASIC has a voltage doubler circuit at the front end and requires an AC (capactive) coupling circuit that will prevent the ASIC from discharge. Thus, a replacement for this capacitance is required for the ASIC for antennas that do not provide capacitance. An antenna with a conductive path completely between the terminals of the antenna improves protection from ESD damage. The inductance of such an antenna can be used effectively to match the input capacitance of the ASIC at microwave frequencies. However, this type of antenna does not contain the series capacitance needed for proper operation of the voltage doubler. The voltage doubler is used to rectify the microwave signal received by the tag to supply DC power for the tag.

The incorporation of a capacitor to supply the needed capacitance requires two-sided plating using a single substrate to implement the coupling capacitor between the antenna and the ASIC (with the tag electronics), or, alternatively, a two-piece construction with the antenna and one plate of the capacitor on one substrate and the other plate of the capacitor and the ASIC on the other substrate. Such a discrete capacitor could be used at the expense of increased cost, reduced reliability and limitations on packaging and construction.

The present invention implements an alternative construction of the coupling capacitor using the AC coupling of electric fields between fingers making up the two electrodes of the capacitor. These fingers are intertwined, or can be described as 'interdigital.' Such construction allows the use of a single substrate with plating on only one side. That reduces construction costs, improves reliability, improves performance and allows improved material and packaging options.

Figure 5:
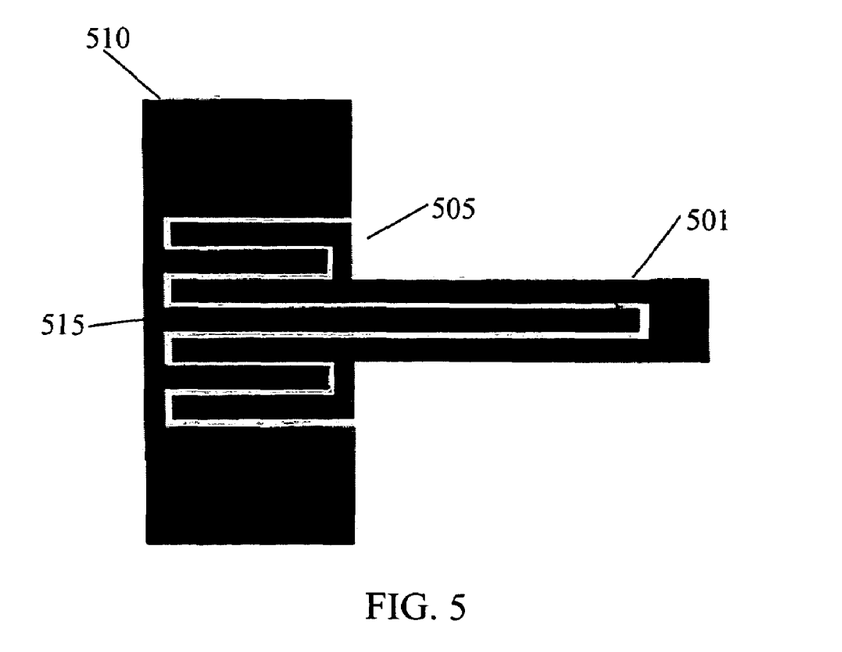
FIG. 5 is layout illustrating detailed element of an interdigit AC coupling circuit, according to at least one embodiment of the present invention.

FIG. 5 provides details of an interdigit AC coupling that can be employed in place of the needed capacitor. The element is constructed in an interdigital form where one set of "fingers" are connected together to maintain the interdigit gap from the other set of "fingers," to create capacitive AC couplings. In one embodiment, the interdigit gap is approximately 0.015". The interdigit gap and the number of fingers can be varied to change the capacitive AC coupling and may be dependent on the obtainable etching accuracies, as well as the operating frequencies. As shown, the opposite portions 501 and 510 are separated to form the interdigit gap, with the finger portions 505 and 515 increasing the ACs that are coupled. As described below, one of the portions is connected to the antenna and the other to the ASIC.

Figure 3:
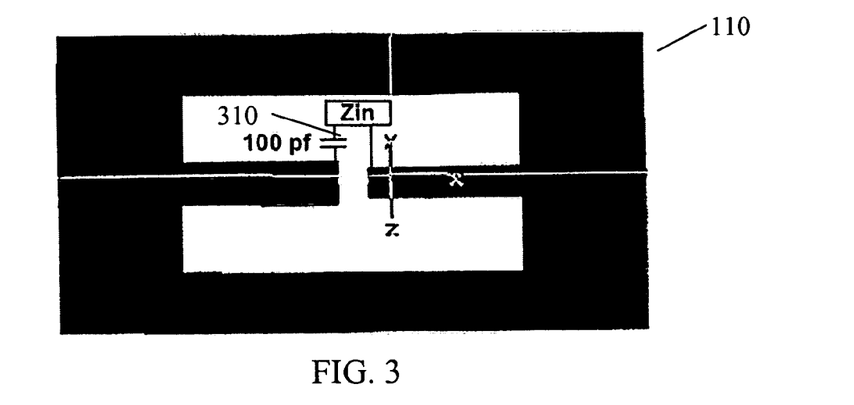
FIG. 3 is an antenna structure with a coupling capacitor, according to the above discussions.
Figure 4:
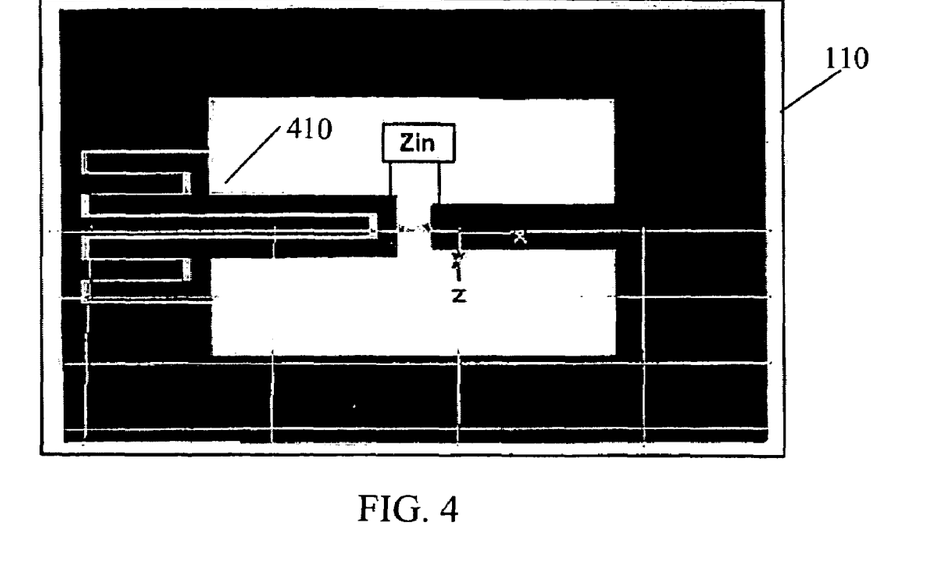
FIG. 4 is an antenna structure with an interdigit AC coupling circuit, according to at least one embodiment of the present invention.

To prove the efficacy of the interdigit AC coupling to achieve the desired AC coupling, computer simulation technology (CST) is used in antenna simulations for antenna impedance and antenna gain. FIG. 3 shows an antenna structure 110 coupled with a capacitor 310. In this embodiment, the capacitor has a capacitance of approximately 100 pF because an impedance of 100 pF is negligible at 915 MHz. FIG. 4 illustrates an antenna structure 110 with an interdigit AC coupling 410. The two antenna structures are used in the CST simulations that are discussed below.

A comparison of the simulation results from the two antenna structures is presented in Table 1 below:

TABLE 1

| Frequency (MHz) | 100 pF Cap Coupling | | | Interdigit Coupling | | |
|---|---|---|---|---|---|---|
| | Zin (Real) | Zin (Img) | Ant Gain (dBi) | Zin (Real) | Zin (Img) | Ant Gain (dBi) |
| 850 | 60 | 430 | 2.53 | 74 | 465 | 2.52 |
| 915 | 206 | 612 | 2.58 | 309 | 309 | 2.55 |
| 950 | 389 | 704 | 2.57 | 652 | 652 | 2.57 |

Accordingly, as shown by the above table, the input impedances and the gains for the two antenna structures are comparable. The interdigit AC coupling can achieve a 2.55 dBi antenna gain at 915 MHz, while the antenna with 100 pF capacitor coupling achieves 2.58 dBi gain at the same frequency. The antenna impedances are somewhat different. Practically, the CST simulations indicate that the interdigit AC coupling can be used to obtain the same antenna gain as a capacitor by optimizing the antenna matching circuit to overcome different antenna impedance requirements.

Optimum power delivery from the antenna to a load, here the ASIC, requires a conjugate match as close as is practicable at each and every frequency in a band of frequencies over which the antenna is designed to operate. The antenna gain should not vary appreciably over the frequency band. Since the reactance of the antenna with interdigit coupling of the present invention behaves as an inductor, that desire is achieved, and produces an improved match over a band of frequencies. The antenna gain is less influenced by operating frequency and nearby metallic or dielectric objects than other types of antennas.

Figure 6:
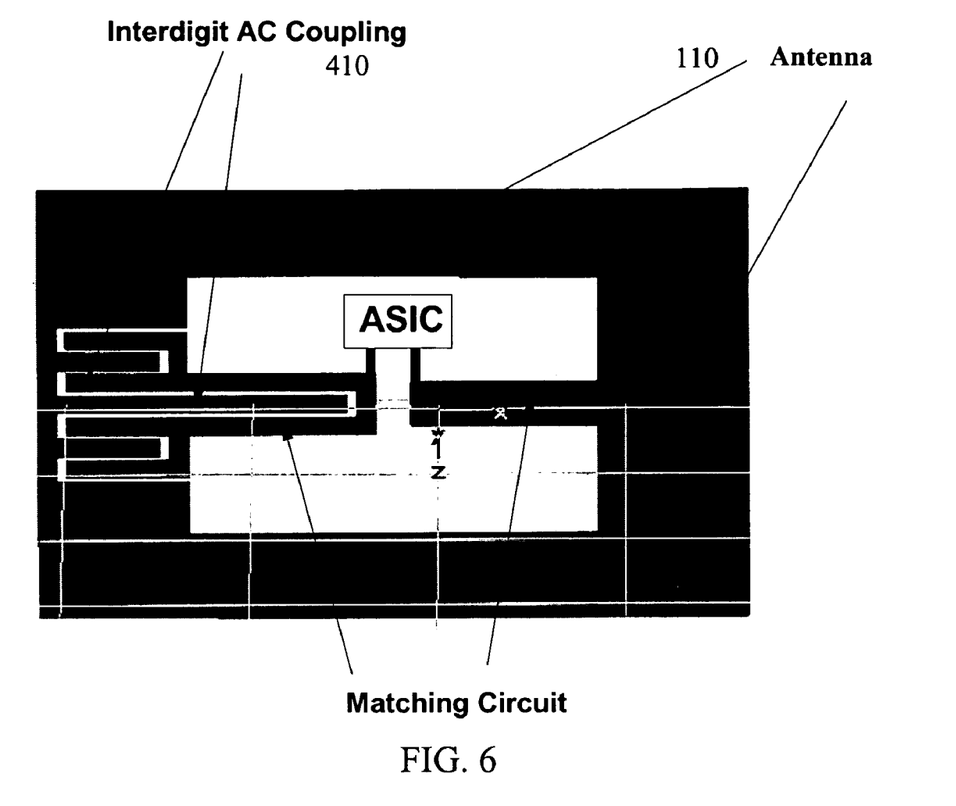
FIG. 6 is a top view of an RFID tag showing the antenna, the interdigit AC coupling circuit, the matching circuits and ASIC, according to at least one embodiment of the present invention.

An RFID tag according to at least one embodiment of the present invention is illustrated in FIG. 6. Therein, the ASIC is coupled to the antenna 110 through a matching circuit and an interdigit AC coupling element 410. The ASIC is mounted on the same layer from which the antenna, interdigit AC coupling element and the matching circuit are fabricated. Such integration of tag elements is easier and cheaper to manufacture and can lead to a lower cost product.

Figure 7:
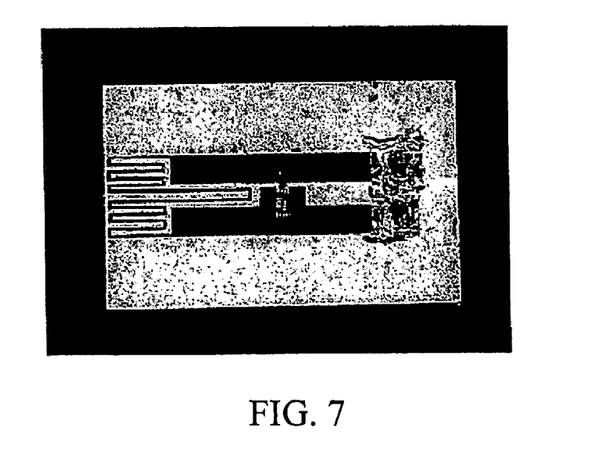
FIG. 7 is a photograph illustrating a prototype RFID tag, according to at least one embodiment of the present invention.
Figure 8:
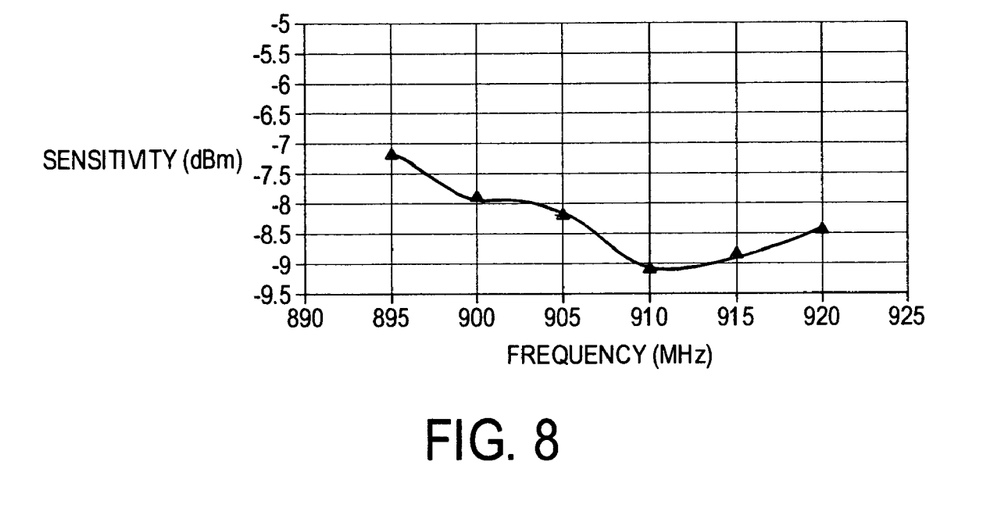
FIG. 8 is graph showing the sensitivity of the prototype RFID with interdigit AC coupling, according to at least one embodiment of the present invention.

The present invention was also implemented in a prototype circuit illustrated in FIG. 7. The prototype measures 2.0" wide and 3.0" long and allows for the actual testing of RFID tag performance. Such performance is illustrated in the graph shown in FIG. 8, where the sensitivity as a function of frequency is plotted. The prototype shows respectable performance for a prototype, when compared to prototypes made for prior art RFID tag systems.

The present invention uses an interdigital AC coupling as a coupling capacitor with large capacitance of a value that need not be exact. Thus, if the value of capacitance changes when the tag is mounted on materials with varying dielectric constant, the circuit functions properly independent of the dielectric constant of the material (i.e. windshield glass) on which the tag is mounted. Proper tuning of the tag involves design that does not depend on the exact value of the coupling capacitor. The primary benefits of the instant invention include reduced cost, improved reliability, improved performance, and improved material and packaging options.

The foregoing description and drawings should be considered as only illustrative of the principles of the invention. The invention may be configured in a variety of ways and is not intended to be limited by the preferred embodiments or methods. Numerous applications of the invention will readily occur to those skilled in the art from a consideration of the foregoing description. Therefore, the invention is not to be limited to the specific examples disclosed or the construction and operation shown and described. Rather, all suitable modifications and equivalents may be resorted to, within the scope of the invention as defined in the appended claims.

What is claimed is:

1. A radio frequency identification (RFID) tag to be attached to an object to identify the object or a characteristic or feature thereof from data stored in the tag accessible by an RFID reader, said RFID tag comprising: an application-specific integrated circuit (ASIC), configured to process signals from the RFID reader and return signals related to the stored data; an interdigit AC coupling circuit, in communication with the ASIC; a matching circuit, in communication with the interdigit AC coupling circuit; and an antenna, in communication with the matching circuit, configured to receive signals from the RFID reader and transmit the signals related to the stored data; wherein the interdigit AC coupling circuit and the matching circuit provide an AC coupling and a matching impedance between the ASIC and the antenna respectively; and wherein the interdigit AC coupling comprises a number of pairs of interdigit fingers with a coupling gap between the pairs of interdigit fingers and wherein the number of pairs of interdigit fingers and the coupling gap are selected so that the interdigit AC coupling circuit and the matching circuit provide a matching impedance to an impedance of the antenna.

2. The RFID tag of claim 1, wherein the interdigit AC coupling circuit, the matching circuit and the antenna are fabricated from a single layer.

3. The RFID tag of claim 2, wherein the RFID tag further comprises a substrate layer and the single layer is formed on the substrate layer.

4. The RFID tag of claim 3, wherein said substrate layer is a sticker for self-adhesion to the object.

5. The RFID tag of claim 3, wherein said substrate layer is a flexible layer.

6. The RFID tag of claim 2, wherein the interdigit AC coupling circuit, the matching circuit and the antenna are formed from copper.

7. The RFID tag of claim 2, wherein the interdigit AC coupling circuit, the matching circuit and the antenna are formed from conductive ink.

8. The RFID tag of claim 1, wherein said tag is passive.

9. The RFID tag of claim 1, wherein the ASIC, the interdigit AC coupling circuit, the matching circuit and the antenna are encompassed within a coating for protection against damage from ambient environment.

10. The RFID tag of claim 1, configured to be applied wherein said object is a vehicle and said surface is the windshield of the vehicle, for RF communication of said tag with an RFID reader in the vicinity of said vehicle.

11. The RFID tag of claim 1, wherein an impedance magnitude of the interdigit AC coupling circuit approximately 5 ohms and an operating impedance magnitude is approximately 400 ohms at operating frequencies.

12. A method of enabling a vehicle to be detected automatically as being authorized for passage through a lane equipped with an RFID reader, comprising the step of:
making available to the vehicle an RFID tag in the form of a planar compact sticker that incorporates a storage medium programmed with authorization data that identifies the vehicle as being permitted to pass through said lane without stopping, said sticker further comprising an application-specific integrated circuit (ASIC), configured to process signals from the RFID reader and return signals related to the stored data, an interdigit AC coupling circuit, in communication with the ASIC, a matching circuit, in communication with the interdigit AC coupling circuit and an antenna, in communication with the matching circuit, configured to receive signals from the RFID reader and transmit the signals related to the stored data, and wherein the interdigit AC coupling circuit and the matching circuit provide an AC coupling and a matching impedance between the ASIC and the antenna respectively.

13. The method according to claim 12, including the step of affixing said sticker to the windshield of the vehicle.

14. The method according to claim 12, wherein said storage medium is programmed with authorization data that uniquely identifies the vehicle as being permitted to pass through said lane.

15. The method according to claim 12, wherein said lane is for vehicle passage to or from a parking facility.

16. The method according to claim 15, wherein said lane is a payment collection lane for automatic debiting of payment due with each passage of the vehicle therethrough.

17. The method according to claim 15, wherein said lane is a toll collection lane for automatic on-the-fly roadway toll collection with each passage of the vehicle therethrough.

18. A method of making a radio frequency identification (RFID) tag to be attached to an object to identify the object or a characteristic or feature thereof from data stored in the tag accessible by an RFID reader, the method comprising the steps of:
providing a substrate layer;
forming an interdigit AC coupling circuit, a matching circuit and an antenna from a single layer on the substrate layer; and
mounting an application-specific integrated circuit (ASIC), configured to process signals from the RFID reader and return signals related to the stored data;
wherein the interdigit AC coupling circuit is in communication with the ASIC, the matching circuit is in communication with the interdigit AC coupling circuit and the antenna is in communication with the matching circuit, where the antenna is configured to receive signals from the RFID reader and transmit the signals related to the stored data and wherein the interdigit AC coupling circuit and the matching circuit provide an AC coupling and a matching impedance between the ASIC and the antenna respectively.

19. The method of claim 18, wherein the step of providing the substrate layer comprises providing a sticker layer for self-adhesion to the object.

20. The method of claim 18, wherein the step of forming the interdigit AC coupling circuit, the matching circuit and the antenna comprises forming the interdigit AC coupling circuit, the matching circuit and the antenna from one of copper and conductive ink.

21. A radio frequency identification (RFID) tag to be attached to an object to identify the object or a characteristic or feature thereof from data stored in the tag accessible by an RFID reader, the RFID tag having an application-specific integrated circuit (ASIC) and an antenna, wherein: a interdigit AC coupling circuit and a matching circuit provide an AC coupling and a matching impedance between the ASIC and the antenna respectively; and wherein the interdigit AC coupling comprises a number of pairs of interdigit fingers with a coupling gap between the Pairs of interdigit fingers and wherein the number of pairs of interdigit fingers and the coupling gap are selected so that the interdigit AC coupling circuit and the matching circuit provide a matching impedance to an impedance of the antenna.

22. The RFID tag of claim 21, wherein the interdigit AC coupling circuit, the matching circuit and the antenna are fabricated from a single layer.

23. The RFID tag of claim 22, wherein the RFID tag further comprises a substrate layer and the single layer is formed on the substrate layer.

24. The RFID tag of claim 23, wherein said substrate layer is a sticker for self-adhesion to the object.

25. The RFID tag of claim 23, wherein said substrate layer is a flexible layer.

26. The RFID tag of claim 22, wherein the interdigit AC coupling circuit, the matching circuit and the antenna are formed from copper.

27. The RFID tag of claim 22, wherein the interdigit AC coupling circuit, the matching circuit and the antenna are formed from conductive ink.

28. The RFID tag of claim 21, wherein said tag is passive.

29. The RFID tag of claim 21, wherein the ASIC, the interdigit AC coupling circuit, the matching circuit and the antenna are encompassed within a coating for protection against damage from ambient environment.

30. The RFID tag of claim 21, configured to be applied wherein said object is a vehicle and said surface is the windshield of the vehicle, for RF communication of said tag with an RFID reader in the vicinity of said vehicle.

31. The RFID tag of claim 21, wherein an impedance magnitude of the interdigit AC coupling circuit approximately 5 ohms and an operating impedance magnitude is approximately 400 ohms at operating frequencies.

* * * * *